United States Patent Office 3,030,364
Patented Apr. 17, 1962

3,030,364
IMIDAZOLIUM QUATERNARY SALTS AND
METHODS OF PREPARING SAME
Edward F. Rogers, Middletown, and Robert L. Clark,
Woodbridge, N.J., assignors to Merck & Co., Inc.,
Rahway, N.J., a corporation of New Jersey
No Drawing. Filed Feb. 2, 1960, Ser. No. 6,103
11 Claims. (Cl. 260—256.4)

This invention relates to novel imidazolium quaternary salts. More particularly, it relates to 3-(2-lower alkyl-4-amino-5 - pyrimidylmethyl) - 1 - substituted imidazolium quaternary salts and methods of preparing the same. It is also concerned with compositions containing such salts.

According to the present invention it has been found that the 3-(2-lower alkyl-4-amino-5-pyrimidylmethyl)-1-lower alkyl imidazolium and 3-(2-lower alkyl-4-amino-5-pyrimidylmethyl)-1-allyl imidazolium quaternary salts have useful medicinal properties and are particularly suitable for use in the treatment and prevention of coccidiosis in poultry.

The compounds with which this invention is concerned may be represented by the general formula

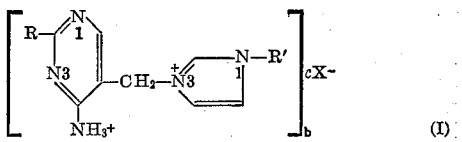

(I)

wherein R is a lower alkyl radical, R' is an allyl or lower alkyl radical, X is an anion, and b and c are positive numbers having values such that the positive charge of b moles of cation is neutralized by c moles of anion X. Thus, for example, when X is a monovalent anion such as a halide, b is 1 and c is 2. As will be apparent from the above structural formula, the compounds described herein may be considered as substituted imidazoles. The imidazole ring is substituted at the 3-position by a 2-lower alkyl-4-amino-5-pyrimidylmethyl radical. It is further substituted at the 1-position by an allyl or lower alkyl radical. The pyrimidine moiety also contains a lower alkyl group at the 2-position of the pyrimidine ring. The lower alkyl groups present in the pyrimidine and imidazole portions of these salts need not, of course, be the same in any particular compound.

With further regard of Formula I, the anion (designated as X) may be an inorganic anion such as chloride, bromide, iodide, nitrate, sulfate, phosphate and the like, or the anion of an organic acid such as citric, tartaric, acetic, picric, stearic, succinic, benzoic, phthalic, phenoxyacetic, embonic, abietic, 2-naphthalene sulfonic, or ethylenediamine tetraacetic acids. It may also be the anion of a polymer such as polyphosphate or polystyrenesulfonate. The nature of the anion is not critical and any anion may be employed as long as it is not unduly toxic for the poultry. However, the anions of the mineral acids and strong organic acids are preferred. It will be realized by those skilled in this art that an acid addition salt of the primary amino group present in these compounds will also be formed concurrently with the quaternary salt. Accordingly, it is to be understood that the expression "quaternary salt" is being used in this specification and claims to mean the acid addition salt of such quaternary salt.

The compounds of this invention are prepared by reacting an acid addition salt of an ester of a 2-lower alkyl-4-amino-5-hydroxymethyl pyrimidine and a strong acid with a 1-allyl or 1-lower alkyl imidazole compound. According to the preferred process, an acid addition salt of an ester of a 2-lower alkyl-4-amino-5-hydroxymethyl pyrimidine and a hydrohalic acid is reacted directly with the substituted imidazole. This process may be represented as follows:

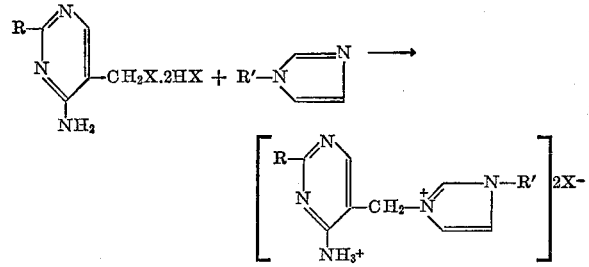

where R is a lower alkyl radical, R' is an allyl or lower alkyl radical and X is a halogen, such as chlorine or bromine.

Although the proportions of reactants are indicated to be equimolar in the above equation such proportions are not critical and an excess of either reactant can also be suitably reacted. Preferably, however, an excess of the substituted imidazole reactant is employed.

The reaction is preferably carried out in the presence of an organic solvent which is inert under the reaction conditions. Illustrative of the solvents which may be employed as the reaction medium are the lower alkanols, such as methanol, ethanol, propanol and the like, acetonitrile and the N,N-diloweralkyl alkanoamides. The reaction temperature is not critical and it is preferred to carry out the process at about room temperature. At room temperature the reaction is generally complete after from 5–20 hours or more according to the concentration of reactants and particular reactants employed. However, appreciable amounts of the products are obtained after a short period of time. The products precipitate out from the reaction mixture on standing at room temperature or on the addition of a suitable precipitant such as ether, ethyl acetate and the like and can be recovered by filtration or other conventional techniques.

Although the acid addition salt of the 5-hydroxymethyl pyrimidine esters of hydrohalic acids, i.e. the halomethyl pyrimidine dihydrohalides, are preferably employed for reaction with the substituted imidazoles, the acid addition salt of the 5-hydroxymethyl pyrimidine esters of other strong inorganic acids such as nitric, phosphoric, sulfuric and the like may be used. In addition, the quaternization may also be brought about employing the acid addition salt of the 5-hydroxymethyl pyrimidine esters of strong organic acids such as the methyl sulfonate, p-toluenesulfonate, benzene sulfonate and naphthalene sulfonate esters.

The quaternization may be conducted so that the particular salt desired is obtained directly or the quaternary salt recovered from the reaction medium may be conveniently metathesized to the desired salt by techniques known in the art.

Among the 3-(2-lower alkyl-4-amino-5-pyrimidylmethyl)-1-substituted imidazolium quaternary salts which may be formed according to the present invention are the 3-(2-methyl-4-amino-5-pyrimidylmethyl)-1-methyl imidazolium salts, 3-(2-methyl-4-amino-5-pyrimidylmethyl)-1-ethyl imidazolium salts, 3-(2-ethyl-4-amino-5-pyrimidylmethyl)-1-methyl imidazolium salts, 3-(2-ethyl-4-amino-5-pyrimidylmethyl)-1-ethyl imidazolium salts, 3-(2-ethyl-4-amino-5-pyrimidylmethyl)-1-allyl imidazolium salts, 3-(2-n-propyl-4-amino-5-pyrimidylmethyl)-1-ethyl imidazolium salts, and 3-(2-n-butyl-4-amino-5-pyrimidylmethyl)-1-ethyl imidazolium salts.

As previously indicated herein, the compounds of this invention are useful in the treatment and prevention of coccidiosis in poultry. These compounds are conveniently fed to poultry as a component of the feed of the animals although they may also be given dissolved or suspended in the drinking water. According to one aspect of the invention, novel compositions are provided in which an imidazolium quaternary salt is present as an active anticoccidial ingredient. Such compositions comprise the quaternary salts intimately dispersed in or admixed with an inert carrier or diluent. By an inert carrier is meant one that is non-reactive with respect to the quaternary and that may be administered with safety to the animals. The carrier or diluent is preferably one that is or may be an ingredient of the animal feed.

The compositions which are a preferred feature of the invention are the so-called feed supplements in which the active ingredient is present in relatively large amounts and which are suitable for addition to the poultry feed directly or after an intermediate dilution or blending step. Examples of carriers or diluents suitable for such compositions are solid orally ingestable carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The quaternary salts are intimately dispersed or admixed throughout the solid inert carrier by methods such as grinding, stirring, milling or tumbling. By selecting proper diluents and by altering the ratio of carrier to active ingredient, compositions of any desired concentrations may be prepared. Formulations containing from about 1% to about 40% by weight, and preferably from about 2–25% by weight of active ingredient are particularly suitable for addition to poultry feeds, and compositions containing from about 5–15% by weight of coccidiostat are very satisfactory. The active compound is normally dispersed or mixed uniformly in the diluent but in some instances may be sorbed on the carrier. The optimal concentration of coccidiostat in these feed supplements will depend to some extent on the particular compound employed. Since it is convenient for the feed manufacturer to use about one pound of feed supplement for each ton of finished feed, the preferred concentration of any one of our coccidiostats in a feed supplement is partly a function of the level of active ingredient desired in the finished feed.

Examples of typical feed supplements containing a imidazolium quaternary salt dispersed in a solid inert carrier are:

|  | Lbs. |
|---|---|
| A. 3 - (2 - methyl - 4 - amino - 5 - pyrimidylmethyl)-1-methyl imidazolium bromide hydrobromide | 6.0 |
| Wheat standard middlings | 94.0 |
| B. 3 - (2 - ethyl - 4 - amino - 5 - pyrimidylmethyl)-1-methyl imidazolium bromide hydrobromide | 10.0 |
| Corn distillers' dried grains | 90.0 |
| C. 3 - (2 - methyl - 4 - amino - 5 - pyrimidylmethyl)-1-ethyl imidazolium chloride hydrochloride | 15.0 |
| Wheat standard middlings | 85.0 |
| D. 3 - (2 - ethyl - 4 - amino - 5 - pyrimidylmethyl)-1 - ethyl imidazolium chloride hydrochloride | 20.0 |
| Corn germ meal | 30.0 |
| Corn distillers' grains | 50.0 |
| E. 3 - (2 - ethyl - 4 - amino - 5 - pyrimidylmethyl)-1-allyl imidazolium chloride hydrochloride | 5.0 |
| Fermentation residues | 50.0 |
| Wheat shorts | 45.0 |
| F. 3 - (2 - n - propyl - 4 - amino - 5 - pyrimidylmethyl)-1-ethyl imidazolium sulfate | 12.0 |
| Molasses solubles | 88.0 |
| G. 3 - (2 - n - butyl - 4 - amino - 5 - pyrimidylmethyl)-1-ethyl imidazolium embonate | 40.0 |
| Ground oyster shells | 60.0 |

These and similar feed supplements are prepared by uniformly mixing the imidazolium quaternary salt with the carrier or carriers.

The feed supplements of the type illustrated hereinabove are usually further diluted with materials such as corn meal or soybean meal before being incorporated in the animal feed. In this intermediate processing step the level of coccidiostat in the carrier is brought down to from about 0.1% to about 1.0% by weight. This dilution serves to facilitate uniform distribution of the substance in the finished feed. The finished feed is one that contains a source of fat, protein, carbohydrate, minerals, vitamins and other nutritional factors.

The amount of imidazolium quaternary salt required for optimum control of coccidiosis in poultry will, of course, vary somewhat with the specific compound or compounds employed. In general, the compounds of Formula I are effective when administered in concentrations of about 0.005% to 0.05% in the diet. For most satisfactory results from the standpoint of both efficacy and incidence of undesirable side effects it is preferred that the poultry feed contain between about 0.0025% and 0.025% by weight of imidazolium salt. When the imidazolium salts are to be employed as therapeutic agents, the higher concentrations may be used for relatively short periods of time. Thus, concentrations of about 0.02% to 0.05% by weight of the feed may be advantageously administered in treating an established outbreak of coccidiosis. When these compounds are employed as therapeutic agents it is desirable to employ the lowest levels that afford fully adequate control of coccidiosis in order to eliminate as far as possible any risk of side effects that might appear on prolonged feeding of the compounds.

Many of the imidazolium quaternary salts of this invention are desirably or advantageously administered to poultry by way of the drinking water of the birds. This method of treatment is often employed in the therapeutic use of our compounds since poultry with coccidiosis are apt to consume less solid feed than normal birds. The water-soluble quaternary salts may be added directly to the drinking water. Alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat and preparations containing from 1–25% by weight of active compound are suitable.

The following examples are added to illustrate the production of specific compounds provided by this invention but it is understood that the invention is not to be restricted thereby to the embodiments disclosed in these examples.

EXAMPLE 1

3-(2-Ethyl-4-Amino-5-Pyrimidylmethyl)-1-Methyl Imidazolium Bromide Hydrobromide

To a stirred suspension of 12 g. of 2-ethyl-4-amino-5-pyrimidylmethyl bromide dihydrobromide in 75 ml. of acetonitrile is added 14 g. of 1-methyl imidazole. The mixture becomes warm and a clear solution results. After allowing the reaction mixture to stand for 20 hours at room temperature the crystalline 3-(2-ethyl-4-amino-5-pyrimidylmethyl)-1-methyl imidazolium bromide hydrobromide which forms is recovered by filtration and recrystallized from methanol by the addition of acetone. The crystalline 3-(2-ethyl-4-amino-5-pyrimidylmethyl)-1-methyl imidazolium bromide hydrobromide thus obtained has a melting point of 270° C. (dec.).

EXAMPLE 2

3-(2-Methyl-4-Amino-5-Pyrimidylmethyl)-1-Methyl Imidazolium Bromide Hydrobromide To 5.0 g. of 2-methyl-4-amino-5-pyrimidylmethyl bromide dihydrobromide suspended in 30 ml. of acetonitrile is added 3.3 g. of 1-methyl imidazole. After allowing the mixture to stand overnight at room temperature the solid 3-(2-methyl-4-amino-5-pyrimidylmethyl)-1-methyl imidazolium bromide hydrobromide which forms is recovered by filtration, washed with acetone and dried to constant weight.

EXAMPLE 3

*3-(2-Ethyl-4-Amino-5-Pyrimidylmethyl)-1-Allyl Imidazolium Bromide Hydrobromide*

The procedure of Example 2 is followed and 12.2 g. of 2-ethyl-4-amino-5-pyrimidylmethyl bromide dihydrobromide suspended in 65 ml. of methanol is reacted with 10.8 g. of 1-allyl imidazole to produce the 3-(2-ethyl-4-amino-5-pyrimidylmethyl)-1-allyl imidazolium bromide hydrobromide.

EXAMPLE 4

*3-(2-n-Propyl-4-Amino-5-Pyrimidylmethyl)-1-Ethyl Imidazolium Chloride Hydrochloride*

To a suspension of 7.5 g. of 2-n-propyl-4-amino-5-pyrimidylmethyl chloride dihydrochloride in 40 ml. of acetonitrile is added with stirring 9.0 g. of 1-ethyl imidazole. The reaction mixture is allowed to stand overnight at room temperature and then filtered. The solid 3-(2-n-propyl-4-amino-5-pyrimidylmethyl)-1-ethyl imidazolium chloride hydrochloride thus obtained is then washed with acetone and dried to constant weight.

EXAMPLE 5

*3-(2-Butyl-4-Amino-5-Pyrimidylmethyl)-1-Ethyl Imidazolium Bromide Hydrobromide*

The procedure of Example 4 is followed and 12.3 g. of 2-butyl-4-amino-5-pyrimidylmethyl bromide dihydrobromide suspended in 70 ml. of acetonitrile is reacted with 10.0 g. of 1-ethyl imidazole to produce 3-(2-butyl-4-amino-5-pyrimidylmethyl)-1-ethyl imidazolium bromide hydrobromide.

EXAMPLE 6

*3-(2-Ethyl-4-Amino-5-Pyrimidylmethyl)-1-Methyl Imidazolium-1,5-Naphthalene Disulfonate*

3.8 g. of 3-(2-ethyl-4-amino-5-pyrimidylmethyl)-1-methyl imidazolium bromide hydrobromide is dissolved in 10 ml. of water. To this solution is added 2.9 g. of 1,5-naphthalene disulfonic acid. After allowing the reaction mixture to stand in ice water for 2 hours, the solid 3-(2-ethyl-4-amino - 5 - pyrimidylmethyl) - 1 - methyl imidazolium-1,5-naphthalene disulfonate which forms is recovered by filtration, washed with water and dried to constant weight.

EXAMPLE 7

One gram of 3-(2-ethyl-4-amino-5-pyrimidylmethyl)-1-methyl imidazolium bromide hydrobromide is dissolved in 4 ml. of concentrated hydrochloric acid. The resulting solution is then diluted with 60 ml. of acetone and the precipitate of 3-(2-ethyl-4-amino-5-pyrimidylmethyl)-1-methyl imidazolium chloride hydrochloride which forms is recovered by filtration. This salt is then dissolved in about 2 ml. of concentrated hydrochloric acid and the solution slowly diluted with about 40 ml. of acetone to precipitate the 3-(2-ethyl-4-amino-5-pyrimidylmethyl)-1-methyl imidazolium chloride hydrochloride which is then recovered by filtration and dried to constant weight.

EXAMPLE 8

When the quaternary salt of Examples 2, 3 and 5 are treated with hydrochloric acid by the method of Example 7 the corresponding chloride hydrochloride quaternary salts are obtained.

EXAMPLE 9

The 2-lower alkyl-4-amino-5-halomethyl pyrimidines employed in making the quaternary compounds of this invention are prepared by methods described in the literature or in the following manner:

A. *2-lower alkyl-4-amino-5-cyanopyrimidine.*—A slurry of 54.7 grams of butyramidine hydrochloride and 55 ml. of absolute ethanol is treated at about 5° C. with a solution of 11 grams of sodium in 220 ml. of absolute ethanol. The resulting solution is added with stirring at 10–12° C. over a thirty minute period to 53.7 grams of ethoxymethylenemalononitrile in 54 ml. of absolute ethanol. The resulting mixture is stirred at 0° C. for six hours and then at room temperature for about 12 hours. The mixture is then filtered, evaporated to dryness in vacuo and the residue treated with water. The alcoholic and aqueous solution precipitates are combined, washed with water and dried in air. The product is recrystallized from alcohol to give 2-n-propyl-4-amino-5-cyanopyrimidine.

When the above reaction is carried out with acetamidine there is obtained 2-methyl-4-amino-5-cyano-pyrimidine. When propionamidine is employed as starting material the end product is 2-ethyl-4-amino-5-cyanopyrimidine.

B. *2-lower alkyl-4-amino-5-aminomethyl pyrimidine dihydrochloride.*—16.2 grams of 2-n-propyl-4-amino-5-cyanopyrimidine is reduced at about 40 lbs. pressure in 200 ml. of methanol in the presence of 26 grams of ammonia and one tablespoon of Raney nickel. The drop in pressure is about 36.5 lbs. The reaction mixture on completion of the reduction is concentrated to a syrup after filtering off the catalyst. The residue thus obtained is acidified with dilute hydrochloric acid and concentrated to a crystalline mass. On recrystallization from methanol-acetone there is obtained 2-n-propyl-4-amino-5-aminomethyl pyrimidine dihydrochloride.

When the 2-methyl and 2-ethyl-4-amino-5-cyanopyrimidines obtained as described above are used as starting materials in this reduction, there are obtained respectively 2-methyl-4-amino-5-aminomethyl pyrimidine dihydrochloride and 2 - ethyl - 4 - amino - 5-aminomethyl pyrimidine dihydrochloride.

C. *2 - lower - alkyl-4-amino-5-hydroxymethyl pyrimidine.*—Twelve grams of 2-n-propyl-4-amino-5-aminomethyl pyrimidine dihydrochloride in 50 ml. of water is treated at 50–60° C. with a solution of 3.5 grams of sodium nitrite in 30 ml. of water. The sodium nitrite is added dropwise over a 45 minute period. The heating is continued for an additional two hours, and the reaction mixture then made alkaline with sodium carbonate and extracted with butanol. The butanol extract is evaporated to dryness and the residue crystallized from acetone to give 2-n-propyl-4-amino-5-hydroxymethyl pyrimidine.

When the 2-methyl and 2-ethyl-4-amino-5-aminomethyl pyrimidine dihydrochlorides obtained as in part B above are utilized in this reaction in place of the 2-n-propyl compound, there are obtained 2-methyl-4-amino-5-hydroxymethyl pyrimidine and 2-ethyl-4-amino-5-hydroxymethyl pyrimidine.

D. *2 - lower alkyl - 4 - amino-5-bromomethyl pyrimidine.*—The 2-n-propyl-4-amino-5-hydroxymethyl pyrimidine obtained in part C above is dissolved in 15 ml. of acetic acid saturated with hydrogen bromide, and the mixture allowed to stand at room temperature for about 15 hours. 2 - n-propyl-4-amino-5-bromomethyl pyrimidine dihydrobromide crystallizes and is recovered by filtration and washed with ether. The material is substantially pure and may be used directly in preparing the quaternary salts of this invention.

The other 2-lower alkyl-4-amino-5-hydroxymethyl pyrimidines described above are treated in like manner with hydrogen bromide to give 2-methyl-4-amino-5-bromomethyl pyrimidine dihydrobromide and 2-ethyl-4-amino-5-bromomethyl pyrimidine dihydrobromide.

Any departure from the above description which conforms to the present invention is intended to be included within the scope of the claims.

What is claimed is:

1. A compound having the formula

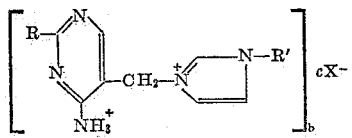

wherein R is a lower alkyl radical, R' is selected from the group consisting of allyl and lower alkyl, X is a non-toxic anion, and $b$ and $c$ are positive numbers having values such that $b$ moles of cation is neutralized by $c$ moles of anion X.

2. 3 - (2 - lower alkyl-4-amino-5-pyrimidylmethyl)-1-lower alkyl imidazolium quaternary salt.

3. 3-(2-lower alkyl-4-amino-5-pyrimidylmethyl)-1-allyl imidazolium quaternary salt.

4. 3 - (2 - lower alkyl-4-amino-5-pyrimidylmethyl)-1-methyl imidazolium quaternary salt.

5. 3 - (2 - lower alkyl-4-amino-5-pyrimidylmethyl)-1-ethyl imidazolium quaternary salt.

6. 3 - (2-methyl-4-amino-5-pyrimidylmethyl)-1-methyl imidazolium halide hydrohalide.

7. 3 - (2 - ethyl-4-amino-5-pyrimidylmethyl)-1-methyl imidazolium halide hydrohalide.

8. 3 - (2 - ethyl - 4 - amino-5-pyrimidylmethyl)-1-allyl imidazolium halide hydrohalide.

9. 3 - (2-n-propyl-4-amino-5-pyrimidylmethyl)-1-ethyl imidazolium halide hydrohalide.

10. The process which comprises reacting an acid addition salt of a 2-lower alkyl-4-amino-5-hydroxylmethyl pyrimidine ester of a strong acid wih a 1-lower alkyl imidazole to form a 3-(2-lower alkyl-4-amino-5-pyrimidylmethyl)-1-lower alkyl imidazolium quaternary salt.

11. The process which comprises reacting an acid addition salt of a 2-lower alkyl-4-amino-5-hydroxymethyl pyrimidine ester of a strong acid with a 1-allyl imidazole to form a 3-(2-lower alkyl-4-amino-5-pyrimidylmethyl)-1-allyl imidazolium quaternary salt.

References Cited in the file of this patent

UNITED STATES PATENTS

| | | |
|---|---|---|
| 2,146,083 | Miller | Feb. 7, 1939 |
| 2,279,421 | Tisdale | Apr. 14, 1942 |
| 2,350,265 | Williams et al. | May 30, 1944 |
| 2,587,262 | Wilson et al. | Feb. 28, 1952 |